United States Patent [19]

Giberti-Fornaciari

[11] Patent Number: 4,710,218
[45] Date of Patent: Dec. 1, 1987

[54] TAKE-OUT TONG HEAD ASSEMBLY

[75] Inventor: Serse Giberti-Fornaciari, Garza Garcia, Mexico

[73] Assignee: Vidriera Monterrey, S.A., Monterrey, Mexico

[21] Appl. No.: 808,354

[22] Filed: Dec. 11, 1985

[30] Foreign Application Priority Data

Dec. 14, 1984 [MX] Mexico .................................. 203756

[51] Int. Cl.⁴ ............................................... C03B 9/44
[52] U.S. Cl. ........................................ 65/260; 65/239; 65/241; 65/323; 294/86.29; 294/110.1; 414/739
[58] Field of Search ................ 65/239, 241, 323, 260; 294/86.29, 110.1

[56] References Cited

U.S. PATENT DOCUMENTS

| | | | |
|---|---|---|---|
| 1,859,956 | 5/1932 | Canfield | 414/739 |
| 2,018,030 | 10/1935 | O'Neil et al. | 65/239 |
| 3,559,425 | 2/1971 | Irwin et al. | 65/239 X |

Primary Examiner—Arthur Kellogg
Attorney, Agent, or Firm—Abelman Frayne Rezac & Schwab

[57] ABSTRACT

A take-out tong head assembly for a glass blowing machine is mounted in a take-out mechanism for omnidirectional adjustment of the tong head assembly in a plane perpendicular to the vertical axis of the blow molds for the purpose of eliminating checks in the blown articles formed in said glass blowing machine.

3 Claims, 5 Drawing Figures

TAKE-OUT TONG HEAD ASSEMBLY

BACKGROUND OF THE INVENTION

In the manufacturing process of glass articles, such as by the blow-blow process, a gob of molten glass is fed to each one of the machine's sections, for example of the I.S. type which forms a pre-form of the container or parison in an inverted position, and also forms the container crown. The preform is then inverted to its normal position and placed in a blow mold, where it receives a final air blowing, thus shaping the container to the desired final shape.

Once the final blowing has taken place, a take-out mechanism then transfers the container from the blow mold to a cooling plate where the container receives an initial cooling. Later, the container is transported on an endless moving belt to a glass annealing lehr.

Take-out mechanism used in I.S. glass forming machines are well known and essentially include an arm that is pivotally supported at one of its ends on a supporting structure which is placed at the front of the machine, and which is moved so that it oscillates angularly from the position of the finishing mold to the position of the cooling plate. A tong head assembly is supported at the end of the oscillating arm and moves in a relationship that is dependent to the oscillatory movement of the said arm, and supports at least a pair of tongs which are located at the lower extreme end of the tong head. A mechanism is provided for simultaneously opening and closing the tong assembly.

Although known take-out mechanisms operate more or less efficiently, they can cause a defect at the neck of the blown article due to differences in position of the vertical axis of the tongs and the vertical axis of the blow mold.

The defects appearing on the articles is caused at the time the tongs close. If variation exists between the axes, one of the halves of the tongs will contact the article before the other, and in so doing will push the container laterally, at which time the glass that is still in a hot state.

The ideal is that the tongs close without contacting the glass, and, that contact with the glass takes place after the ascending movement of the mechanism starts. However, it is very difficult to make the required adjustment between the tongs and the center of the blow mold.

Consequently, the take-out mechanisms of the prior art leave much to be desired, since it is not possible to adjust them accurately and it is not easy to eliminate lack of proper alignment between the blow mold and the tongs.

SUMMARY OF THE INVENTION

According to the present invention there is provided a take-out tong head assembly for glassware forming machines, which can be adjusted transversely, longitudinally, and for angular movement relative to the central axis of the finishing mold, thus eliminating defects (checks) at the neck of the containers.

Another object of the present invention is to provide a take-out tong head assembly in which the alignment between the tongs and the central axis of the mold is improved.

A further object of the present invention is to provide a take-out tong head assembly which will guarantee that the tongs close around the neck of the container without there being contact with the glass article.

BRIEF DESCRIPTION OF THE DRAWINGS

A preferred embodiment of the present invention is now described with reference to the accompanying drawings in which.

DETAILED DESCRIPTION

Figure 1:
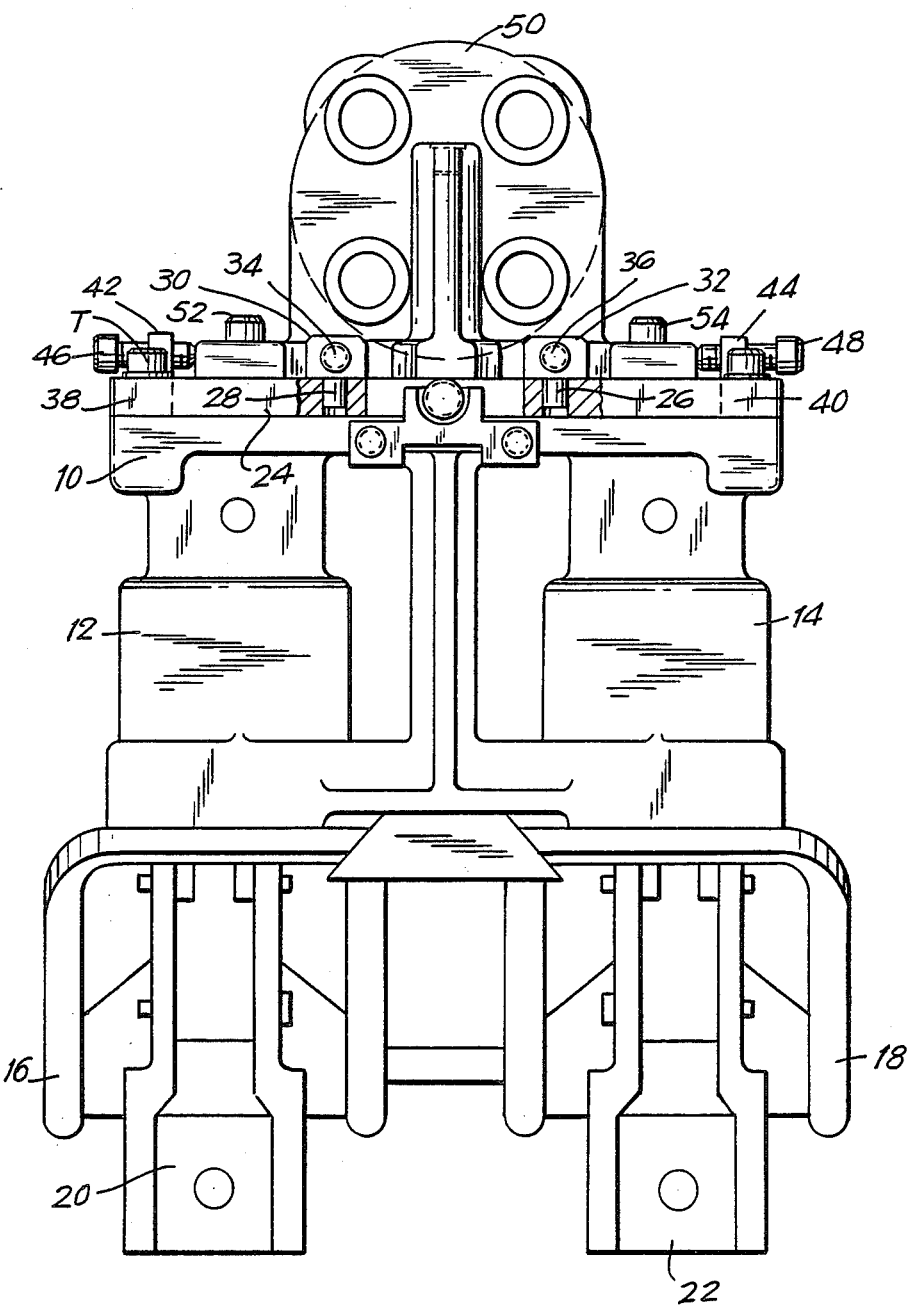
FIG. 1 is a front elevation of the take-out tong head assembly showing a mechanism for adjusting the position of the take-out mechanism relative to a blow mold.
Figure 2:
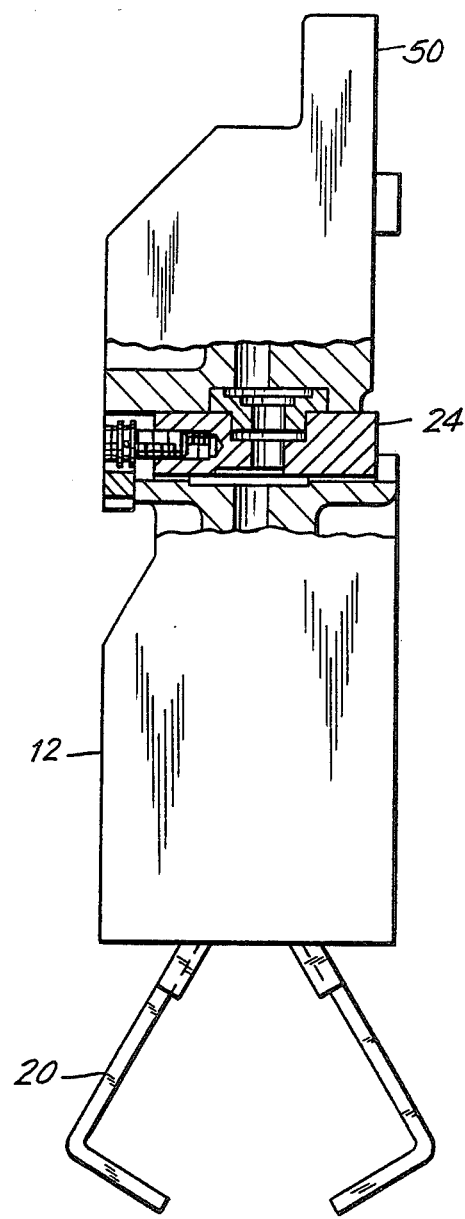
FIG. 2 is a side elevation of the take-out tong head assembly of FIG. 1.

The drawings show a take-out tong head assembly which includes a support 10 for a pair of cylinders 12, 14, which each have a tong holder guide bracket 16, 18 attached at their lower part. Each guide bracket 16, 18 is provided with a pair of scissors tongs assemblies 20, 22, which are used to grab the glass articles by the neck and to transfer them to a cooling plate located at the front of the forming machine. Each one of the cylinders 12, 14 includes a piston rod (not shown), which is connected to the tongs 20, 22, and which through pneumatic pressure opens or closes the tongs 20, 22 in conformity with the operation cycle of the forming machine.

The take-out tong head assembly includes an adjustment plate 24 fastened to the top part of the support 10 by screws to the plate 24 includes a first pair of openings 26, 28 spaced on the longer sides of the plate 24 in which are received supports 30, 32. The upper portion of each support 30, 32 includes a threaded opening through which screws 34, 35 extend in order to effect transverse and angular adjustments of the lower support 10.

A second pair of openings 38, 40 in the plate 24 are provided at positions spaced from the shorter sides of the plate 24. Supports 42, 44 are received in the openings 38, 40. Screws 46, 48 are threaded into openings of the supports 42, 44 in order to effect the longitudinal movement of said support 10.

An upper support 50 is positioned above plate 24 between supports 30, 32 and 42, 44 in such a way that screws 34, 36 and 46, 48 can be axially moved into engagement with the support 50 in order to adjust the take-out tong head assembly to a desired angular position with respect to the support 50. To permit this adjustment, a pair of screws 52, 54 extend through apertures in the support 50 and are threaded into the adjustment plate 24. A washer 56, 58 is positioned between the support 50 and the heads of the screws 52, 54 in order to provide support for the plate 24, and thus the lower support 10 and thus permit freedom of movement of the lower support 10 in the desired direction prior to tightening down of the screws 52, 54.

The upper support 50 is attached to an arm (not shown) of the take-out mechanism, which is employed to transport articles from the blow mold to a cooling plate.

Figure 3A:
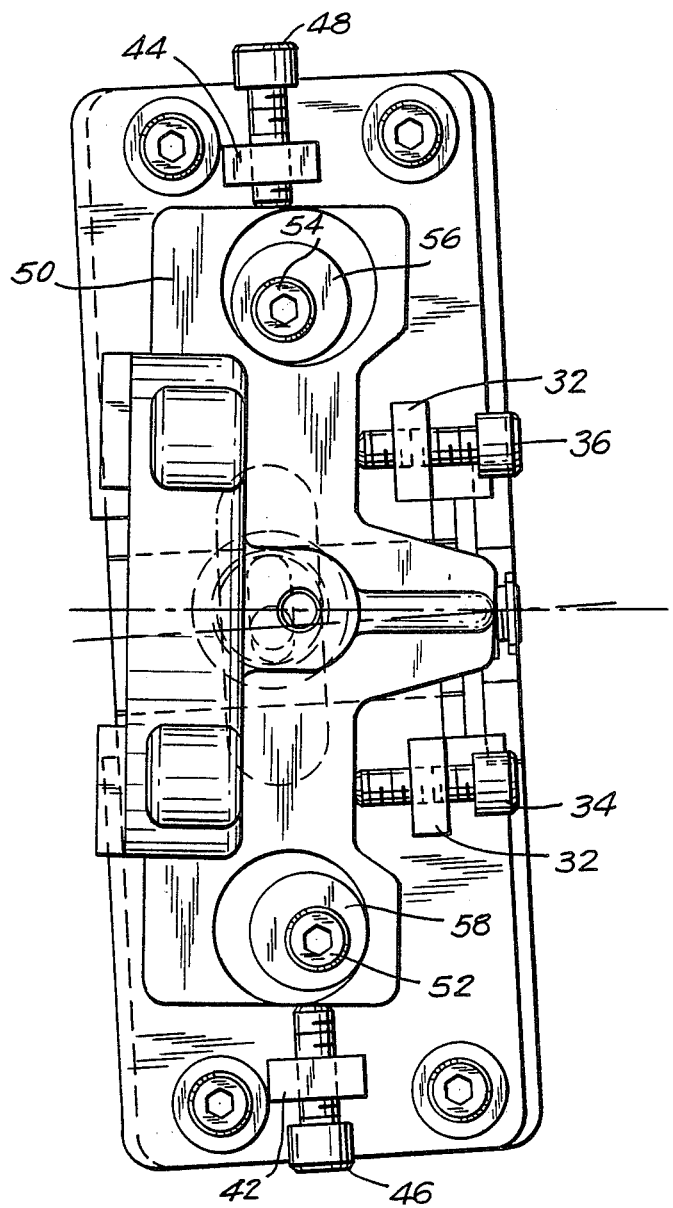
FIGS. 3A, 3B, and 3C, are plan views of the take-out tong head assembly illustrating the adjustment movements thereof.
Figure 3B:
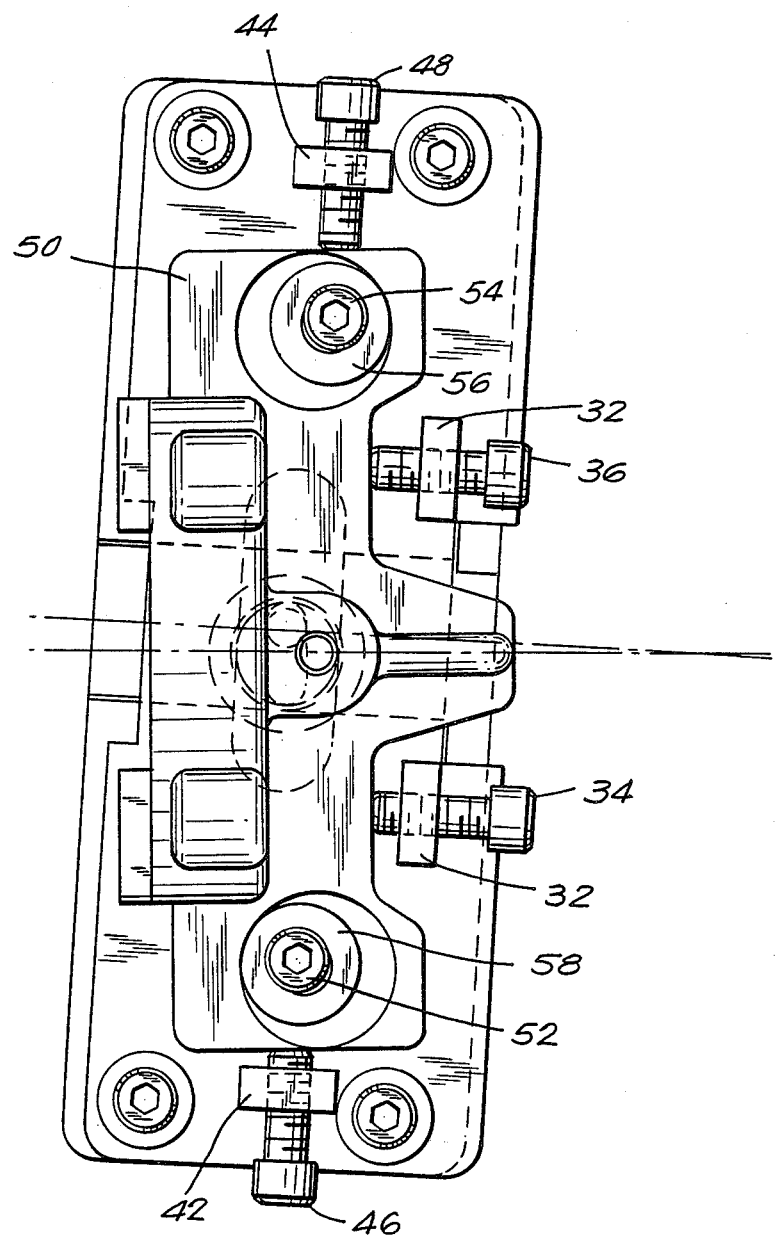
Figure 3C:
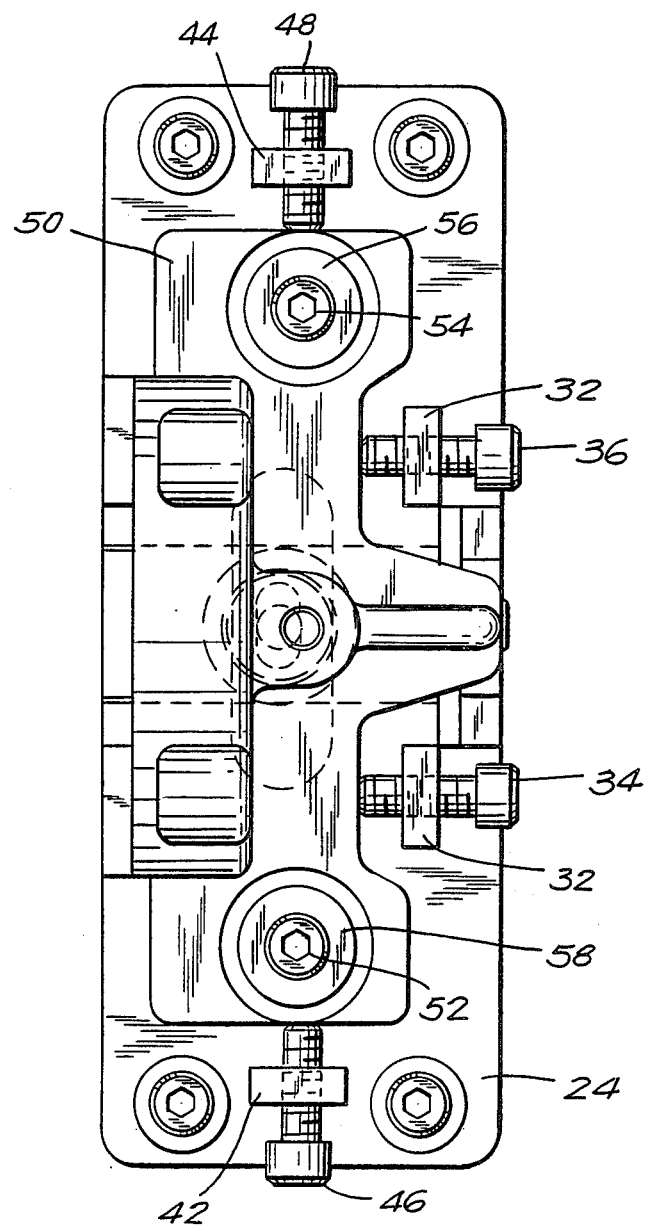

Adjustments of the tongs relative to the blow mold can be easily made by loosening screws 52, 54 of the upper support 50 and then appropriately adjusting the screws 34, 36 and 46, 48 to move the lower support 10, as shown in FIGS. 3A, 3B and 3C, in such a direction that the central axis of the blow mold and the central axis of the tongs become coincident. Once the adjustment has been made, screws 52, 54 are tightened to lock the lower support 10 in its adjusted position.

It will be appreciated that various modifications may be made in the embodiment described above without departing from the scope of the appended claims.

I claim:

1. A take-out tong head assembly for a glass blowing machine of the type including tongs for gripping and holding a blown article during its transfer from a blow mold to a cooling plate, including:
    at least one pair of tongs supported for movement towards and away from each other on opposite sides of a central vertical axis;
    means for effecting movement of said tongs to alternatively grip and release an article of blown glassware formed in said glass blowing machine;
    a first support on which said tongs and said means for movement of said tongs are mounted;
    a second support coupled to an arm of a take out mechanism, said arm being supported for oscillation angularly from the position of the blow mold to the position of cooling plate; and,
    means for controllably adjusting the position of said first support relative to said second support for omnidirectional adjustment in a plane perpendicular to said vertical axis to permit co-axial alignment of said vertical axis to said tongs with a vertical axis of the blow mold in which said glass article has been formed.

2. The take-out tong head assembly of claim 1, wherein said means for adjusting the position of said first and second supports, comprising:
    an adjustment plate fastened to the top part of said first support, said plate including cooperating planar surfaces each extending perpendicular to said vertical axis of said tongs;
    screw means reacting between said first and second supports in direction parallel to said planar surfaces of said plate, for controllably adjusting the position of said first support omnidirectionally, in said plane perpendicular to the vertical axis of said blow mold; and,
    means for releasably locking said first and second supports to each other in a selected position of adjustment.

3. The take-out tong head assembly of the claim 2, in which said screw means includes posts fast with said first support and which carry adjusting screws arranged with their longitudinal axis parallel to the planar surfaces of said plate, said adjusting screws being positioned for them to react against said second support to effect adjustment of said first support relative to said second support in a plane perpendicular to the vertical axis of said tongs, and in which said releasable locking means includes headed screws freely extending through enlarged apertures in said second support and threaded into said first support for clamping said adjustment plate and said supports.

* * * * *